United States Patent Office 3,143,539
Patented Aug. 4, 1964

3,143,539
PRODUCTION OF PROCESSABLE POLYOLEFINS
Kelly Farhat and Frederick J. Webb, Akron, Ohio, assignors to The Firestone Tire & Rubber Company, Akron, Ohio, a corporation of Ohio
No Drawing. Filed Feb. 4, 1960, Ser. No. 6,623
2 Claims. (Cl. 260—94.9)

This invention relates to the production of olefin polymers having molecular weights within a range permitting them to be readily fabricated by extrusion, molding and other similar operations.

Certain processes for the production of polyolefins result in products of excessively high molecular weight, so that the products cannot be handled in the extrusion, injection molding and similar operations ordinarily used in the plastics industry. This is particularly true of the low-pressure processes of polymerization, making use of heavy-metal-containing catalysts, for instance catalysts produced by reducing heavy metal compounds with metallic or organometallic reducing compounds or by subjecting certain metallic oxides to an oxidizing roasting treatment. Various expedients have been proposed to overcome this difficulty. For instance, hydrogen, mercaptans or other molecular-weight-controlling compounds may be incorporated in the polymerization mass, or the ratio of ingredients in, or method of preparation of, the catalysts may be varied. These expedients are, on the whole, unsatisfactory, since they usually involve a departure from the optimum mode of operation, and in any event require repeated adjustments of the polymerization operation to meet the demand for various grades of products.

One approach to the problem would be to operate the polymerization process in the manner found to be the optimum from the standpoint of economy and throughput, without any attempt to reduce the molecular weight of the product, and to subject the resultant polymers to some sort of a breakdown operation to bring the molecular weight down to the required range. Prospectively, this would have the advantage of allowing the polymerization operation to be carried out in an uninterrupted and optimum manner, while the desired variety of end-products may be obtained by carrying out the breakdown step to varying degrees. However, no successful proposal along this line has so far appeared.

Accordingly, it is an object of this invention to provide a process for the breaking down of olefin polymers of intractable high molecular weights to products which may be fabricated in conventional extrusion, molding and similar operations.

Another object is to provide such a process in which the properties of the product other than the molecular weight are not adversely affected.

A further object is to provide such a process which may be carried out in simple equipment, with relatively unskilled attendance, and with the use of only trifling amounts of inexpensive reactants.

SYNOPSIS OF THE INVENTION

The above and other objects are secured, in accordance with this invention, in a process which comprises heating a polyolefin, optionally with simultaneous mechanical working, in admixture with a polyalkylene oxide condensation product. Depending on the properties desired for the final product, the treatment may be carried out under conditions of greater or less rigor, resulting in products having molecular weights reduced to correspondingly greater or less degrees.

THE POLYOLEFINS

The polyolefins to which the present invention is applied are high molecular weight polymers, having intrinsic viscosities in the range above about 1.5, of any of the lower alpha-olefins containing from 2 to 8 carbon atoms, such as ethylene, propylene, butene-1, pentene-1, hexene-1, octene-1, vinyl cyclohexane, 3-methyl hexene-1, and the like. It will be understood that the polymers may have copolymerized therein minor proportions (say up to 35%) of unsaturated compounds other than the alpha-unsaturated olefins, for instance, styrene, butadiene, alpha-methyl styrene, and the like. The method by which the polymer was prepared from the monomers is not directly important, since the process of this invention will effect a reduction of molecular weight of any high molecular weight olefin polymer. However, the problem of excessive molecular weight arises most frequently in connection with the so-called "low pressure polyolefins" produced by the use of metallic compound catalysts. Examples of such catalysts are those produced by the partial reduction of compounds (e.g. oxides, halides, oxyhalides, alcoholates, etc.) of heavy metals such as titanium, vanadium, nickel, cobalt, iron, chromium, etc. with reducing agents such as the free metals of groups I, II and III of the Periodic Table, or with organometallic compounds of such metals. The problem is particularly acute when the reducing agent used is an adduct produced by reacting a free alkali or alkaline earth metal with a polynuclear aromatic hydrocarbon; catalysts using such adducts to reduce the heavy metal compound are not responsive to hydrogen or the other modifying agents ordinarily used to control molecular weight. Examples of such adducts are those of lithium and sodium with naphthalene, biphenyl, anthracene, chrysene, and the like.

THE POLYALKYLENE OXIDES

These may be any of the materials produced by the condensation of olefin oxides containing from 2 to 10 carbon atoms per molecule to form polyether chains having the repeating units:

(I) 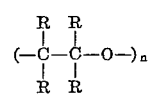

where $n$ is an integer greater than 4, and
R, independently in each occurrence, represents a hydrogen atom or a hydrocarbon group Each of the repeating units in the chain will of course contain from 2 to 10 carbon atoms derived from the original olefin oxide. The polyether chains may terminate at both ends in a hydroxyl group; preferably, however, at least one end is linked through an ether group to a hydrocarbon group such as an alkyl, aryl, or alkyl, aryl group; thus:

(II) 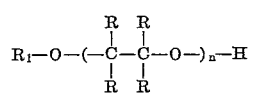

wherein $R_1$ indicates a hydrocarbon group of from 1 to 30 carbon atoms, and the remaining notation is the same as in Formula I above. Alkylene oxides suitable for condensation to form the

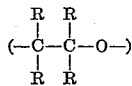

groups in the condensates used in this invention include for instance ethylene oxide, propylene oxide, 1,2-epoxy butane, 1,2-epoxy pentane, 1-cyclohexyl-1,2-epoxy ethane, and the like. The $R_1$ group in Formula II above is generally derived from the hydrocarbon portion of an alcohol or phenol supplied to the reaction in which the alkylene oxides are condensed. Suitable hydrocarbon radicals for the substituent $R_1$ are exemplified in alkyl groups such as ethyl, propyl, butyl, cyclohexyl, 2-ethyl hexyl, dodecyl and octadecyl groups, and aryl and alkaryl groups such as phenyl, tolyl, para-tt-octylphenyl, naphthyl and similar groups. As to the amount of the alkylene oxide condensates to be used, it will be appreciated that there will be no theoretical minimum amount, as any measurable quantity of the condensate will promote a reduction of the molecular weight of the polyolefin to some degree. As a practical matter, it will usually be desirable to supply at least 0.1% of the condensate, based on the weight of the polyolefin, in order to secure an economic rate of molecular weight reduction. Similarly, there is no theoretical upper limit to the amount used; as a practical matter, however, amounts in excess of 10% of the condensate, based on the weight of the polyolefin, will generally be wasteful from an economic standpoint.

THE MANIPULATIONS OF THE PROCESS

In general the process will involve intimately mixing the olefin oxide condensate with the polyolefin, and heating the mixture at temperatures usually in the range 90 to 250° C. but below the decomposition temperature of the polymer for periods of time which will be greater or less, depending respectively on whether a greater or less degree of reduction of molecular weight is desired. The polyolefin will usually be originally in the form of a powder, and the alkylene oxide condensate may be incorporated therein by simple agitation-mixing, as in a ribbon blendor, or vigorous kneading or grinding as in a Banbury mill or on a roll mill. The alkylene oxide condensates, particularly those in which the value of "$n$" in Formula I above is in excess of 5, usually are soluble in water to a substantial extent; and since the polyolefins, particularly those from reduced heavy metal catalyst processes, are frequently subjected to a water-washing step as an incident to their manufacture, the alkylene oxide condensates may be incorporated in the water wash, from which they will be carried along with the resin over into the final drying step. The final drying step will usually be conducted at elevated temperatures, and will serve as the heating step of this invention. It has been found that mechanical agitation, grinding or kneading applied during the heating step will materially assist the reduction in molecular weight. Accordingly, it is often desirable to carry out the invention by mixing the alkylene oxide condensate with the polyolefin and then to subject the mixture to a hot milling action as by means of a roll mill, Banbury mill, internal mixing machine, or extruder. Such hot-milling and extrusion is frequently a regular part of the regular process of manufacture of the olefin polymers, since they usually come from the polymerization process in an extremely finely divided state and must be compacted and/or pelletized under high temperature conditions for shipment. The practice of this invention is readily integrated into such processes by simply adding the alkylene oxide condensates to the polyolefin at a point in advance of the hot compacting and/or pelletizing operation.

With the foregoing general discussion in mind, there are given herewith detailed examples of the practice of this invention.

Example 1

This example illustrates the application of the process to the reduction of molecular weight of a polyethylene produced by a catalyst comprising (A) an adduct of an aromatic hydrocarbon with an alkali metal plus (B) a titanium halide. This system presents a special problem in molecular weight control, since it is not very responsive to the addition of hydrogen or other molecular weight regulating agents, and it is difficult to obtain tractable polymers directly.

A. PREPARATION OF DILITHIUM ADDUCT OF BIPHENYL

| | |
|---|---|
| Biphenyl | 61.6 g. (0.6 mol). |
| Lithium metal dispersion | 16 g. (1.2 g. atom of Li metal). |
| Diethyl ether | 400 ml. |

The above ingredients were charged into a 28-ounce beverage bottle which had previously been baked in an oven at 125° C. and flushed with argon. Fifty one-half-inch stainless steel balls were also charged into the bottle, which was then sealed and encased in a cylindrical metal shield, and the assembly placed on a ball mill roller-cradle nad revolved at the rate of 80 r.p.m. for 72 hours. The bottle was then removed from the cradle and the contents pressured over into a distillation apparatus. In the distillation apparatus the ether was slowly distilled out while n-heptane was added to the pot, so as to effect a replacement of the ether by n-heptane as the vehicle in which the adduct was suspended. This preparation was used in the polymerization described below.

B. POLYMERIZATION

| | |
|---|---|
| Hexane | 38 lbs. |
| Dilithium adduct preparation (composite of several batches prepared as described at A) | Q.s. to provide 0.6 mol of dilithium adduct of biphenyl. |
| Titanium tetrachloride | 22 ml. |

A 10-gallon stainless steel autoclave provided with an anchor stirrer and a heating and cooling jacket was used in the run. Four gallons of the hexane were charged into the reactor, which was then purged with nitrogen, stirring commenced, and the temperature lowered to −23° C. At this point the adduct suspension was slurried with a portion of the withheld hexane, and charged into the reactor, after which the titanium tetrachloride was mixed with the remainder of the hexane and charged into the reactor. Hydrogen was then introduced into the reactor to build up a pressure of 250 p.s.i.g. The temperature was then raised to −10° C., and 1-pound increments of ethylene pressured in at one-half hour intervals, the temperature being regulated according to the following log. The time is taken from the first introduction of ethylene.

TABLE I

| Time (min.) | Temperature (° C.) | Total pressure in reactor (p.s.i.g.) |
|---|---|---|
| 0 | 0 | 0 |
| 35 | 18 | 325 |
| 55 | 23.5 | 430 |
| 80 | 25.0 | 450 |
| 95 | 25 | 490 |
| 140 | 24.5 | 530 |
| 150 | 25.0 | 580 |
| 165 | 24 | 650 |
| 210 | 23 | 650 |
| 270 | 23 | 650 |
| 360 | 23 | 690 |
| 450 | Unreacted gases vented | |

After the gases were vented, two quarts of ethanol were added to the reactor, and stirring continued for a further 30 minutes to destroy the catalyst. The polymer slurry was then removed from the reactor, filtered to remove the solvent, and subjected to a series of washes, each of which consisted of adding the wash solution to the previously filtered polymer, then stirring and heating for a specified time, and filtering off the solution. Following are the wash solutions, temperatures, and durations of the successive washes.

TABLE II

| Wash solution | Temperature ° C. | Time, hr. |
|---|---|---|
| 5 gallons of ethanol plus 2 quarts of conc. HCl | 70–80 | 3 |
| Do | 70–80 | 3 |
| 4 gallons of water plus 1 gallon of ethanol | 25 | ½ |
| 5 gallons of ethanol plus 1 quart of conc. NH$_3$ | 70–80 | 1 |
| 4 gallons of water plus 1 gallon of ethanol | 25 | 1 |

C. TREATMENT WITH ALKYLENE OXIDE CONDENSATE

One portion of polyethylene prepared as above described was slurried with a 1% solution in de-ionized water of an ethylene oxide condensate of the formula

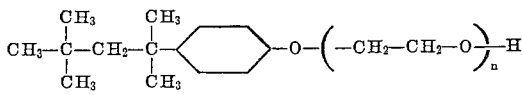

wherein "$n$" was given by the manufacturer as ranging 9–10 ("Triton X–100," a product of the Rohm and Haas Co.). The polyethylene was then separated from the slurry by filtration. The resin, still wet with the solution of the condensate, was exposed in a tray drier in layers 1 inch deep at 100° C. for 65 hours. By way of control, another portion of the polyethylene was washed with de-ionized water, filtered and dried in the same way. The plasticity of each of the two lots of resin was determined by pressing out a 1-gram sample of the resin between aluminum foil sheets in a flat-platen laboratory press at a selected temperature according to the cycle: contact pressure, 10 seconds; pressed at a total load of 2000 lbs., 20 seconds; released, removed from the press and quenched in water. The area of the resultant plaque was taken as a direct measure of the plasticity of the resin, and as an inverse measure of the molecular weight. Tabulated herewith are the properties of the two products.

TABLE III

|  | Resin washed with— | |
|---|---|---|
|  | Condensate solution | Water |
| Plasticity (cm.²) at press temperature of— |  |  |
| 190° C | 3,180 | 2,250 |
| 250° C | 3,910 | 2,390 |
| Density, g./c.c | 0.974 | 0.969 |
| Percent ash | 0.32 | 0.30 |
| Rockwell hardness: |  |  |
| M scale | 58 | 53 |
| R scale | 96 | 98 |
| 300% modulus (p.s.i.) | 3,875 | 3,875 |
| Tensile strength (p.s.i.) | 3,650 | 3,650 |
| Elongation (percent) | 100 | 527 |
| Bending modulus (p.s.i.) | 207,000 | 150,000 |
| Izod impact strength notched, ft.-lbs. per inch of notch: |  |  |
| At 25° C | [1]16.2 | [1]24.5 |
| At 0° C | [1]8.3 | [1]29.9 |

[1] No break.

It will be seen from the plasticity values that the process of the invention, using the condensate solution, effected a substantial reduction in molecular weight, without greatly affecting the other properties excepting, of course, those properties which would inherently depend on molecular weight, such as elongation, bending modulus, and impact strength.

*Example II*

A. PREPARATION OF DISODIUM ADDUCT OF ANTHRACENE

| Anthracene | 17.8 grams (0.1 mol). |
|---|---|
| Sodium paste (35% dispersion in petrolatum) | 13.1 grams (0.2 mol). |
| Xylene | 150 ml. |

A 28-ounce beverage bottle containing 25 one-half inch stainless steel balls was oven dried at 100° C. for one hour and cooled to 25° C. with a stream of argon flowing through it. The anthracene was charged into the bottle immediately upon removal of the bottle from the oven, and after cooling, the sodium paste was slurried in the xylene and poured into the bottle. The bottle was capped, placed in a cylindrical metal bottle guard, and the assembly placed upon a ball mill roller cradle and rotated at about 70 r.p.m. for 112 hours at 25° C.

B. POLYMERIZATION

| Heptane | 350 ml. |
|---|---|
| Suspension of disodium adduct of anthracene (prepared as just described) | 15 ml. (0.01 mol) of disodium adduct of anthracene. |
| Titanium tetrachloride | 0.627 g. (0.0033 mol). |

A high pressure rocking bomb autoclave provided with a stainless steel liner was used in this preparation. The liner was dried in an oven at 110° C. and then cooled to 25° C. by passing a current of argon through it. The heptane was then charged into the liner, followed by the suspension of adduct and the titanium tetrachloride, and the loaded liner sealed into the bomb. The bomb was flushed twice with nitrogen at 500 lbs. p.s.i.g. and then pressured with ethylene to 500 p.s.i.g. The bomb was then set into oscillation. Following is a log of the operation of the bomb during the run:

TABLE IV

| Time (hr. from start) | Temperature (° F.) | Pressure, p.s.i.g. |
|---|---|---|
| 0 | 90 | 500 |
| 0.16 | 115 | 500 |
| .5 | 205 | 450 |
| 2.0 | 150 | [1]225 |
| 3.5 | 125 | [1]350 |
| 5.5 | 115 | [1]400 |
| 21.0 | ---------- | 275 |

[1] Repressured to 500 p.s.i.g.

The unreacted gases were vented and the bomb opened. The bomb contained solid polymer which was removed and broken up in a Waring Blendor. The polymer was subjected to a series of washes as follows: Stirred with 500 ml. of water plus 500 ml. of ethanol and 100 ml. of concentrated hydrochloric acid with refluxing and stirring for one hour; washed on the filter with water and filtered and refluxed one hour with 500 ml. of ethanol plus 500 ml. of water plus 5 ml. of concentrated aqueous ammonia; then filtered and washed on the filter with water. The product was then dried for 18 hours at 100° C.

C. TREATMENT WITH ETHYLENE OXIDE CONDENSATE

| Polyethylene (prepared as just described at B) __g__ | 25 |
|---|---|
| Alkyl aryl polyethylene oxide condensate solution [1] __ml__ | 25 |
| Distilled water __ml__ | 250 |

[1] 1% solution Triton X–100, a product of Rohm & Haas Company stated by them to have the formula

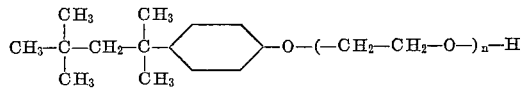

(wherein "$n$" averages 9–10).

The above ingredients were slurried together and stirred and refluxed for one hour. The slurry was then filtered into the polymer, slurried up with 250 ml. of water and again refluxed for one hour. The slurry was then filtered and the cake dried in an oven at 100° C., the samples being removed at intervals and the plasticity thereof determined as described in the preceding example:

TABLE V

| Time of Drying in Oven | Plasticity | |
|---|---|---|
| | At 190° C. | At 250° C. |
| 0 | 2,260 | 1,250 |
| 65 | 2,450 | 3,880 |
| 89 | 2,620 | 4,050 |

It will be seen that the process of this invention effected a very substantial increase in plasticity (reflecting a decrease of molecular weight) of the polymer. It will also be noted that this particular polymer before treatment exhibited what is called a "shrinking characteristic," i.e., the plasticity at high temperature is actually less than the plasticity at low temperature, indicative of an extremely intractable polymer.

*Example III*

A polyethylene was prepared by the process described in Example I, A and B, with the exception that no hydrogen was introduced into the polymerization autoclave, so that the product was completely unmodified and had extremely high molecular weight. One hundred grams of this polyethylene was refluxed for 1 hour with 1 liter of a 1% aqueous solution of the same ethylene oxide condensate described in section C of Example I. The product was then filtered to remove the liquid, refluxed for 1 hour with 1 liter of distilled water, again filtered to remove the liquid, and dried in an oven at 100° C. for 60 hours. Plasticities of this treated polyethylene and of the polyethylene before treatment were determined as described in Example I. Set forth herewith are the plasticities and other properties of the two resins.

TABLE VI

| | Resin | |
|---|---|---|
| | Untreated | Treated with ethylene oxide condensate |
| Plasticity (sq. cm.): | | |
| 190° C | 2,210 | 3,600 |
| 250° C | 1,170 | 5,500 |
| Density | 0.944 | 0.979 |
| Shore hardness (D scale): | | |
| Instant | 98 | 100 |
| 5 sec | 96 | 98 |
| 15 sec | 94 | 98 |
| Shore hardness (C scale): | | |
| Instant | 65 | 67 |
| 5 sec | 63 | 64 |
| 15 sec | 61 | 62 |
| Rockwell hardness: | | |
| R scale | 68 | 95 |
| M scale | 31 | 54 |
| 200% modulus (p.s.i.) | 5,167 | |
| Tensile strength (p.s.i.) | 5,350 | 3,725 |
| Elongation (percent) | 215 | 30 |
| Bending modulus (p.s.i.) | 103,000 | 220,000 |
| Izod impact, notched, ft.-lbs./in notch: | | |
| 25° C | [1] 17.7 | [1] 6.5 |
| −40° C | [1] 24.8 | [1] 1.0 |

[1] No break.

Again it will be seen that the treatment of the polymer by the process of the invention effected a substantial increase in plasticity and reduction in molecular weight, compare the plasticities of the treated and untreated products in the table. It will also again be noted that the untreated polymer exhibited a "shrinking" behavior, indicative of a highly intractable polymer.

*Example IV*

The polyethylene used in this example was as described in Example II, A and B, with the exception that hydrogen was pressured into the polymerization vessel to provide a pressure of 250 p.s.i.g. before any ethylene was introduced.

A "Brabender Plastograph," which is a laboratory-scale heated internal mixer manufactured by the Brabender Corp., was used in this experiment. Three polyethylene compositions were run in the experiment; polyethylene without additives; polyethylene containing 1% of the condensate used in Example I, part C designated "Condensate O" in Table VII below; and polyethylene containing 1% of a condensate of ethylene glycol with a previously-formed condensate of propylene glycol, the entire product having the formula:

$$HO-(-CH_2-CH_2-O-)_x-(-CH_2-CHCH_3)_y-(-CH_2-CH_2-O-)_zH$$

"Pluronic F-68" a product of Wyandotte Chemicals Corp., designated "Condensate P" in Table VII below. In each run, the "Brabender Plastograph" was preliminarily heated to 220–225° C. and a capacity charge of the resin placed in the machine, masticated for 10 minutes, discharged, and quickly cooled. Plasticities of the resin before treatment, and of the three treated portions of resin, were determined as described in Example I, the results being tabulated herewith.

TABLE VII

| Material added to resin | Treatment of resin | Plasticity of resin (sq. mm.) at— | |
|---|---|---|---|
| | | 190° C. | 250° C. |
| None | None | 1,910 | 2,310 |
| None | 10 min. in "Plastograph" | 2,200 | 2,670 |
| Condensate O | do | 2,300 | 3,540 |
| Condensate P | do | 2,330 | 3,130 |

From the table it will be seen that, while the mere mechanical treatment did increase the plasticity even in the absence of the condensates (Table VII, second row) the presence of the alkylene oxide condensates substantially increased the plasticity under corresponding conditions (Table VII, third and fourth rows).

*Example V*

An electrically-heated two-inch laboratory roll mill was used in this experiment. A series of runs was made, in which various resins were milled at high temperatures with various alkylene oxide condensates to reduce the molecular weight thereof. In each case the mill temperature was adjusted to the value selected for the run, the rolls loosened, and 20 grams of the polymer to be treated placed upon the mill. As soon as the polymer formed a consistent band, the rolls were closed and the required amount of the selected alkylene oxide added. Milling was continued for a period of 5 minutes from the time at which the rolls were closed, after which the rolls were reopened, and the polymer removed and quickly cooled. Plasticities of the polymers were determined as described in Example I, and are tabulated herewith.

TABLE VIII

| Polymer used | Treatment | | | Plasticity of treated polymer at— | |
|---|---|---|---|---|---|
| | Type of condensate added | Am't. of condensate added | Milling temp. (° F.) | 190° C. | 250° C. |
| Polybutene [1] | tt-octyl phenol ethylene oxide condensate.[4] | 6 drops | 400 | 8,960 | 10,000 |
| Polypropylene [2] | ...do... | .do | 400 | 6,475 | 10,000 |
| Polyethylene [3] | None | | 460-490 | 4,800 | 6,340 |
| | tt-octyl phenol ethylene oxide condensate.[4] | 6 drops | 460-490 | 8,050 | 10,000 |
| | Triton X-45 [5] | 0.2 g | 460 | 5,200 | 7,930 |
| | Condensate P[6] | 0.2 g | 460 | 4,640 | 7,750 |
| | Condensate Q[7] | 0.2 g | 460 | 7,450 | 8,320 |

[1] Prepared in the presence of a catalyst comprising aluminum alkyl plus titanium tetrachloride.
[2] Prepared in the presence of a catalyst comprising aluminum alkyl plus titanium trichloride.
[3] Prepared as described in Example II.
[4] "Triton X-100" a product of Rohm & Haas Company, stated by them to have the formula

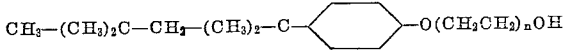

where "$n$" averages 9–10.
[5] Same as footnote 4, except that "$n$" averages 5.
[6] "Pluronic F-68," a product of Wyandotte Chemicals Corp., stated by them to be a condensate of ethylene glycol upon a previously-formed condensate of propylene glycol, the entire product having the formula HO—(—CH$_2$—CH$_2$—O—)$_x$—(—CH$_2$—CHCH$_3$—O—)$_y$—
           (—CH$_2$—CH$_2$—O)$_z$—H

[7] "Tween 80," a product of the Atlas Powder Co., an oleate of a condensate of ethylene oxides with sorbitans.

From the foregoing general discussion and detailed specific examples, it will be evident that this invention provides a novel and effective means for the production of polyolefins having molecular weights reduced to any values which may be required in the subsequent working thereof. The process requires the use of only small quantities of the readily and cheaply available alkylene oxide condensates, and is readily integrated into the existing olefin polymerization processes and plants.

What is claimed is:

1. Process for reducing the molecular weight of a high molecular weight polymer of ethylene having an intrinsic viscosity above 1.5 and having been produced by contact of ethylene with a catalyst obtained by partial reduction of a compound selected from the group consisting of oxides, halides, oxyhalides and alcoholates of titanium, vanadium, nickel, cobalt, iron and chromium by means of a reducing agent selected from the group consisting of the free metals of groups I, II and III of the periodic table and the organometallic compounds of such metals, which comprises washing said polymer with an aqueous solution of a polyoxyolefin having the structure

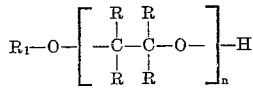

wherein R, independently in each occurrence, represents a substituent selected from the group consisting of hydrogen and hydrocarbon groups, each repeating unit in the brackets containing 2–10 carbon atoms, $n$ is an integer greater than 4, and $R_1$ is a radical selected from the group consisting of hydrogen and hydrocarbon radicals containing 1–30 carbon atoms, the amount of said polyoxyolefin supplied being from 0.1 to 10%, based on the weight of said polymer, and drying and heating the polymer for at least 60 hours at temperatures in the range of 90°–300° C. while still wet with said aqueous solution.

2. Process for reducing the molecular weight of a high molecular weight polyethylene having an intrinsic viscosity above 1.5 and having been obtained by polymerization of ethylene in the presence of a catalyst which is the reaction product of (a) an adduct of an alkali metal with a polynuclear aromatic hydrocarbon with (b) titanium tetrachloride which comprises heating the polyethylene, for at least 60 hours, at 90°–300° C., in contact and admixture with from 0.1 to 10%, based on the weight of said polyethylene, of a mixture of condensation products having the formula

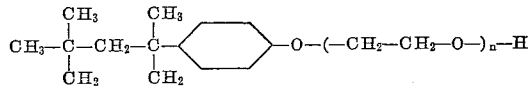

wherein $n$ is an integer in the case of each molecule in the mixture, and averages 9–10 over the entire mixture.

References Cited in the file of this patent
UNITED STATES PATENTS

| | | |
|---|---|---|
| 2,525,691 | Lee et al. | Oct. 10, 1950 |
| 2,930,783 | Weber et al. | Mar. 29, 1960 |
| 2,967,857 | Pfeifer et al. | Jan. 10, 1961 |
| 2,978,431 | Engle | Apr. 4, 1961 |
| 3,070,588 | Klink et al. | Dec. 25, 1962 |
| 3,087,922 | Whittington | Apr. 30, 1963 |